United States Patent
Miyashita

(10) Patent No.: US 9,274,305 B2
(45) Date of Patent: Mar. 1, 2016

(54) IMAGING LENS BARREL AND METHOD FOR CONTROLLING OPERATION OF THE SAME

(71) Applicant: FUJIFILM Corporation, Tokyo (JP)

(72) Inventor: Mamoru Miyashita, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/623,532

(22) Filed: Feb. 17, 2015

(65) Prior Publication Data

US 2015/0160429 A1    Jun. 11, 2015

Related U.S. Application Data

(63) Continuation of application No. PCT/JP2013/069540, filed on Jul. 18, 2013.

(30) Foreign Application Priority Data

Aug. 30, 2012   (JP) .................. 2012-189447

(51) Int. Cl.
   *G02B 7/02*     (2006.01)
   *G02B 7/10*     (2006.01)
   *G02B 7/08*     (2006.01)
   *G01D 5/244*    (2006.01)
   *H04N 5/232*    (2006.01)

(52) U.S. Cl.
   CPC ................ *G02B 7/10* (2013.01); *G01D 5/2449* (2013.01); *G02B 7/08* (2013.01); *H04N 5/23238* (2013.01)

(58) Field of Classification Search
   CPC ....... G01D 5/145; G01D 5/2457; G02B 7/10; G02B 7/09; F16C 41/007; G01P 13/04

USPC .................................................. 359/822–826
   See application file for complete search history.

(56) References Cited

FOREIGN PATENT DOCUMENTS

| JP | 6-58766 | 3/1994 |
|---|---|---|
| JP | 2006-29937 | 2/2006 |
| JP | 2008-533476 | 8/2008 |

(Continued)

OTHER PUBLICATIONS

International Search Report PCT/JP2013/069540 dated Aug. 13, 2013.

(Continued)

*Primary Examiner* — Mahidere Sahle
(74) *Attorney, Agent, or Firm* — Young & Thompson

(57) ABSTRACT

An imaging lens barrel includes: a barrel body; a rotating body; a magnetic sensor device; a phase difference calculation section; a correction table memory; a phase difference correction section configured to, when a relative position between the rotating body and the magnetic sensor device according to a posture of the imaging lens barrel is different from that of when a correction table is created, correct a phase difference calculated by the phase difference calculation section according to the relative position and to correct the phase difference calculated by the phase difference calculation section, using a correction value corresponding to the corrected phase difference, and to, when the relative position is not different from that of when the correction table is created, correct the calculated phase difference, using a correction value corresponding to the phase difference calculated by the phase difference calculation section; and an absolute position calculation section.

5 Claims, 21 Drawing Sheets

(56) References Cited

FOREIGN PATENT DOCUMENTS

| | | |
|---|---|---|
| JP | 2011-027999 | 2/2011 |
| JP | 2012-083313 | 4/2012 |

OTHER PUBLICATIONS

Written Opinion of the International Searching Authority PCT/JP2013/069540 dated Aug. 13, 2013.

Written Opinion of the International Searching Authority in corresponding PCT/JP2013/069540 dated Aug. 13, 2013.

FIG. 8

| PHASE DIFFERENCE | ... | y(n-2) | y(n-1) | y(n) | y(n+1) | y(n+2) | ... |
|---|---|---|---|---|---|---|---|
| AMOUNT OF CORRECTION | ... | Δ(n-2) | Δ(n-1) | Δ(n) | Δ(n+1) | Δ(n+2) | ... |

MOVING DIRECTION OF ZOOM LENS : TELEPHOTO → WIDE

FIG. 10

MOVING DIRECTION OF ZOOM LENS : WIDE → TELEPHOTO

| PHASE DIFFERENCE | ... | $z(n-2)$ | $z(n-1)$ | $z(n)$ | $z(n+1)$ | $z(n+2)$ | ... |
|---|---|---|---|---|---|---|---|
| AMOUNT OF CORRECTION | ... | $\Delta 1(n-2)$ | $\Delta 1(n-1)$ | $\Delta 1(n)$ | $\Delta 1(n+1)$ | $\Delta 1(n+2)$ | ... |

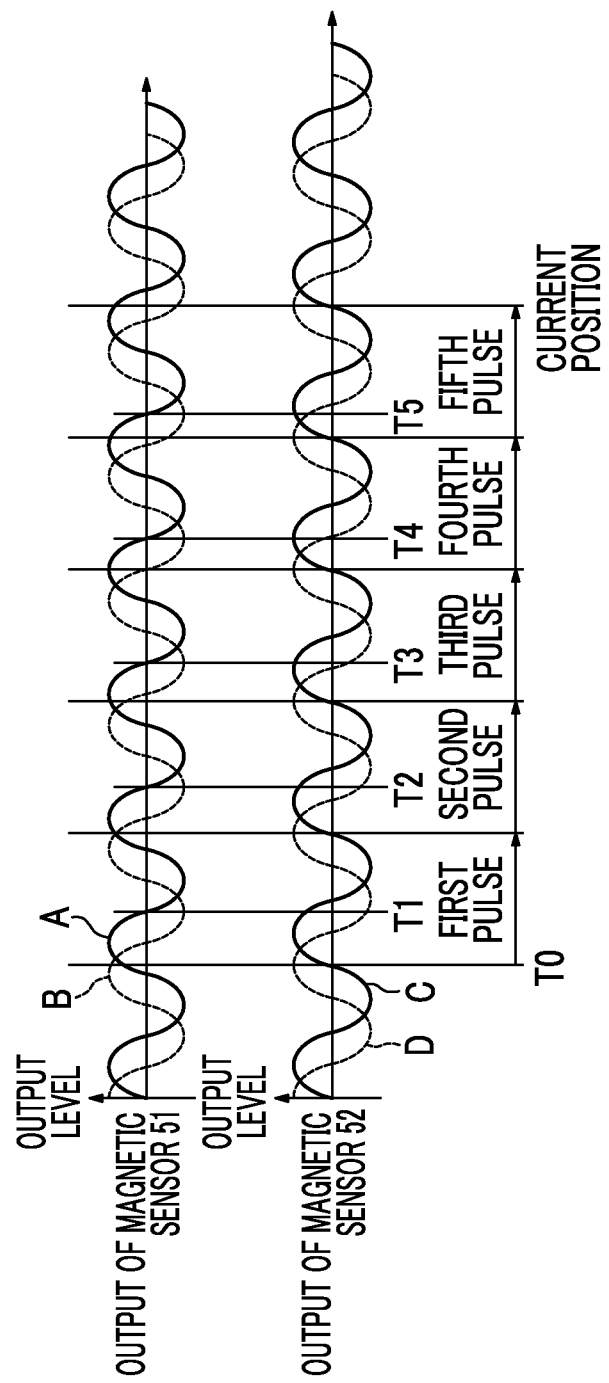

9,274,305 B2

IMAGING LENS BARREL AND METHOD FOR CONTROLLING OPERATION OF THE SAME

CROSS-REFERENCE TO RELATED APPLICATIONS

This application is a Continuation of PCT International Application No. PCT/JP2013/069540 filed on Jul. 18, 2013, which claims priority under 35 USC §119(a) to Japanese Patent Application No. 2012-189447 filed on Aug. 30, 2012. Each of the above applications is hereby expressly incorporated by reference, in its entirety, into the present application.

BACKGROUND OF THE INVENTION

1. Field of the Invention

The claimed invention relates to an imaging lens barrel and a method for controlling an operation of the same.

2. Description of the Related Art

With an increase in the screen size and resolution of a television apparatus, there is an increasing demand for improving the quality of images displayed on a display screen. In order to meet the demand for improving the quality of images, it is necessary to accurately detect the position of an imaging lens provided in movie and broadcasting imaging lens barrels.

For example, JP2011-27999A discloses an endoscopic device which uses an electrostatic encoder as lens position detection means and can determine the position of a lens with high accuracy. For example, JP2012-83313A discloses a position detection device which accurately detects a distance in a wide range with a simple structure and immediately detects an absolute position.

SUMMARY OF THE INVENTION

However, in both JP2011-27999A and JP2012-83313A, the accuracy of detecting the position of the imaging lens is insufficient.

An object of the claimed invention is to provide an imaging lens barrel which can detect the position of an imaging lens with high accuracy and a method of controlling an operation of the imaging lens barrel.

According to an aspect of the claimed invention, an imaging lens barrel includes: a barrel body configured to hold an imaging lens so as to be movable in an optical axis direction; a rotating body configured to rotate in accordance with a movement of the imaging lens, the rotating body including a first magnetic scale and a second magnetic scale which are formed in parallel and in which magnetic components with different wavelengths are periodically magnetized in a circumferential direction; a magnetic sensor device that is provided at a position facing a circumferential surface of the rotating body and includes a first magnetic sensor and a second magnetic sensor, the first magnetic sensor being configured to detect in response to a rotation of the rotating body, from the first magnetic scale, a first phase signal and a second phase signal having a phase shift with respect to the first phase signal, the second magnetic sensor being configured to detect in response to the rotation of the rotating body, from the second magnetic scale, a third phase signal and a fourth phase signal having a phase shift with respect to the third phase signal; a phase difference calculation section configured to calculate a phase difference between the first phase signal and the third phase signal, using the first phase signal and the second phase signal detected by the first magnetic sensor and the third phase signal and the fourth phase signal detected by the second magnetic sensor; a correction table memory that stores a correction table storing a correction value for correcting a difference between the phase difference, which is actually calculated by the phase difference calculation section in response to the rotation of the rotating body, and a design value in association with the phase difference; a phase difference correction section configured to, when a relative position between the rotating body and the magnetic sensor device (that is, a relative position between the first and second magnetic scales and the magnetic sensor device) according to a posture of the imaging lens barrel is different from the position of when the correction table is created, correct the phase difference calculated by the phase difference calculation section according to the relative position and to correct the phase difference calculated by the phase difference calculation section, using a correction value corresponding to the corrected phase difference among the correction values stored in the correction table; and to, when the relative position between the rotating body and the magnetic sensor device according to the posture of the imaging lens barrel is not different from the position of when the correction table is created, correct the phase difference calculated by the phase difference calculation section, using a correction value corresponding to the phase difference calculated by the phase difference calculation section among the correction values stored in the correction table; and an absolute position calculation section configured to calculate an absolute position of the imaging lens from the phase difference corrected by the phase difference correction section and a predetermined relationship between the phase difference and the absolute position of the imaging lens.

Another aspect of the claimed invention provides an Operation control method suitable for an imaging lens barrel. That is, there is provided a method for controlling an operation of an imaging lens barrel including a barrel body configured to hold an imaging lens so as to be movable in an optical axis direction, and a rotating body configured to rotate in accordance with a movement of the imaging lens, the rotating body including a first magnetic scale and a second magnetic scale which are formed in parallel and in which magnetic components with different wavelengths are periodically magnetized in a circumferential direction. The method includes: allowing a phase difference calculation section to calculate a phase difference between a first phase signal and a third phase signal, using the first phase signal and a second phase signal detected by a first magnetic sensor and the third phase signal and a fourth phase signal detected by a second magnetic sensor, the first magnetic sensor and the second magnetic sensor being included in a magnetic sensor device which is provided at a position facing a circumferential surface of the rotating body, the first magnetic sensor being configured to detect in response to a rotation of the rotating body, from the first magnetic scale, the first phase signal, which is a sine wave, and the second phase signal, which has a phase shift with respect to the first phase signal, the second magnetic sensor being configured to detect in response to the rotation of the rotating body, from the second magnetic scale, the third phase signal, which is a sine wave, and the fourth phase signal, which has a phase shift with respect to the third phase signal; allowing a phase difference correction section to, when a relative position between the rotating body and the magnetic sensor device according to a posture of the imaging lens barrel is different from the relative position of when a correction table is created. Which table stores a correction value for correcting a difference between the phase difference, which is actually calculated by the phase difference calculation section in response to the rotation of the rotating body, and a design value in association with the phase difference, correct the phase difference calculated by the phase difference calculation section according to the relative position and to correct the phase difference calculated by the phase difference calculation section, using a correction value corresponding to the corrected phase difference among the correction values stored in the correction table; and to, when the relative position between the rotating body and the magnetic sensor device according to the posture of the imaging lens barrel is not different from the relative position of when the correction table is created, correct the phase difference calculated by the phase difference calculation section, using a correction value corresponding to the phase difference calculated by the phase difference calculation section among the correction values stored in the correction table; and allowing an absolute position calculation section to calculate an absolute position of the imaging lens from the phase difference corrected by the phase difference correction section and a predetermined relationship between the phase difference and the absolute position of the imaging lens.

According to the above-mentioned aspects of the claimed invention, the rotating body is rotated with the movement of the imaging lens. The first magnetic scale and the second magnetic scale in which the magnetic components with different wavelengths are periodically magnetized are formed in parallel in the rotating body. When the rotating body is rotated, the first magnetic sensor detects the first phase signal and the second phase signal having a phase shift with respect to the first phase signal from the first magnetic scale and the second magnetic sensor detects the third phase signal and the fourth phase signal having a phase shift with respect to the third phase signal from the second magnetic scale. The phase difference between the first phase signal and the third phase signal is calculated using the detected first to fourth phase signals. Since the phase difference and the absolute position of the imaging lens are uniquely determined, the absolute position of the imaging lens is calculated on the basis of the calculated phase difference. In the above-mentioned aspects of the claimed invention, the correction table which stores the correction value for correcting the difference between the phase difference, which is actually calculated when the rotating body is rotated, and the design value so as to be associated with the phase difference. Since the absolute position of the imaging lens is calculated after the calculated phase difference is corrected, it is possible to determine the position of the imaging lens with high accuracy. In particular, in the above-mentioned aspects of the claimed invention, when the relative position between the rotating body and the magnetic sensor device is different from that when the correction table is created according to the posture of the imaging lens barrel, the calculated phase difference is corrected according to the relative position. In addition, the calculated phase difference is corrected using the correction value corresponding to the corrected phase difference among the correction values stored in the correction table. The absolute position of the imaging lens is calculated using the corrected phase difference.

In some cases, when the relative position between the rotating body and the magnetic sensor device is different from that when the correction table is created according to the posture of the imaging lens barrel, positional deviation occurs between the magnetic sensor device and the rotating body when the correction table is created and the Obtained phase difference does not indicate an accurate phase difference. Therefore, when the relative position is different from that when the correction table is created, the calculated phase difference is corrected according to the relative position. In addition, the calculated phase difference is corrected using the correction value corresponding to the corrected phase difference among the correction values stored in the correction table. The absolute position of the imaging lens is calculated using the corrected phase difference. As a result, the absolute position of the imaging lens is relatively accurately calculated.

The imaging lens barrel may further include an inclination amount detection section configured to detect an amount of inclination of the imaging lens barrel. In this case, for example, the phase difference correction section may correct the phase difference calculated by the phase difference calculation section according to the amount of inclination detected by the inclination amount detection section and may correct the phase difference calculated by the phase difference calculation section using the correction value corresponding to the corrected phase difference among the correction values stored in the correction table.

For example, the correction table memory may store two correction tables which indicate the difference between the phase difference calculated by the phase difference calculation section and the design value of the phase difference and are obtained when the imaging lens is moved in different directions. In this case, the phase difference correction section may correct the phase difference calculated by the phase difference calculation section using the correction table, which corresponds to the moving direction of the imaging lens, of the two correction tables.

According to the claimed invention, it is possible to detect the position of the imaging lens with high accuracy in the lens barrel.

BRIEF DESCRIPTION OF THE DRAWINGS

FIG. 8 illustrates an example of a correction table.

FIG. 10 illustrates an example of the correction table.

FIG. 21 is a diagram illustrating the waveforms of signals output from the magnetic sensor device.

DESCRIPTION OF THE PREFERRED EMBODIMENTS

Figure 1:
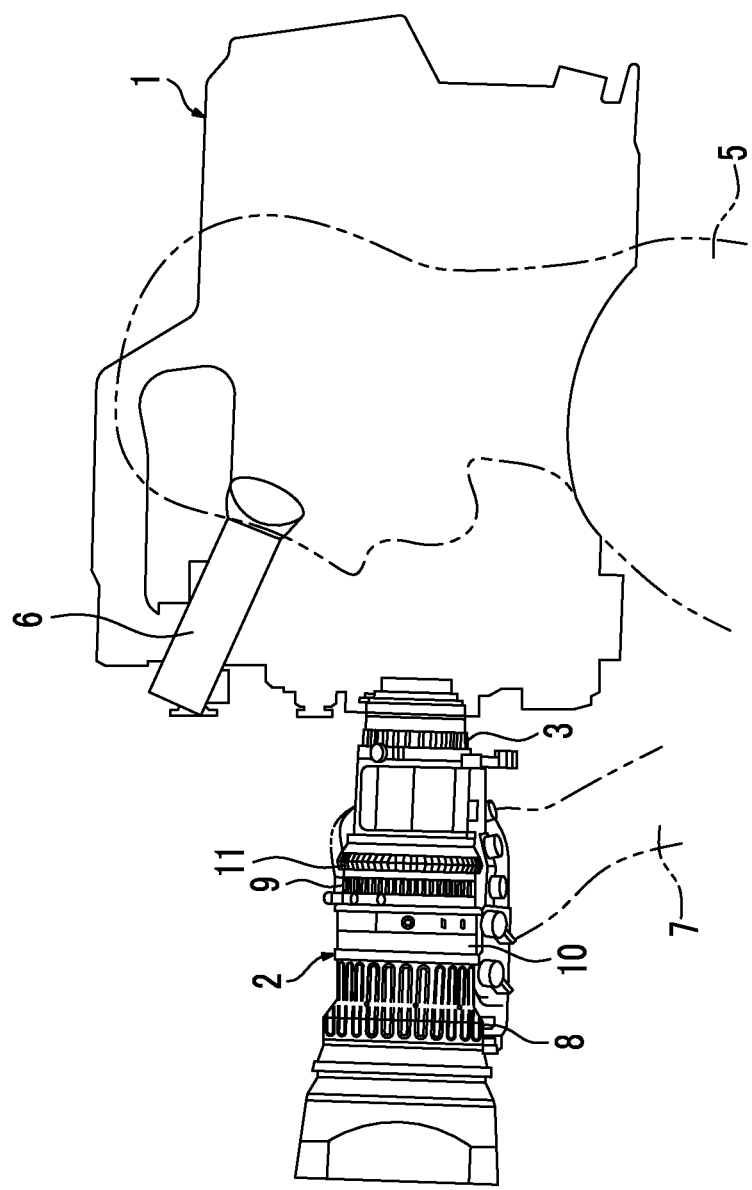
FIG. 1 illustrates the outward appearance of a lens barrel.

FIG. 1 illustrates the usage state of an imaging apparatus provided with a lens barrel (imaging lens barrel) 2 according to an exemplary embodiment of the claimed invention.

The lens barrel 2 includes a cylindrical housing 10 (barrel body). For example, imaging lenses, such as a zoom lens and a focus lens, and an iris are provided in the housing 10. A mount portion 3 is formed in a base portion of the housing 10 of the lens barrel 2. A connection portion of the mount portion 3 is detachably mounted to a lens mount portion which is provided in an anterior part of an imaging apparatus body 1 and the lens barrel 2 is fixed to the imaging apparatus body 1.

An imaging element (not illustrated) is provided in the imaging apparatus body 1 so as to be disposed on the optical axis of the lens barrel 2, with the lens barrel 2 mounted to the imaging apparatus body 1. An optical image which is focused by the lens barrel 2 is captured by the imaging element. An imaging processing device (not illustrated) which is provided in the imaging apparatus body 1 performs predetermined signal processing on an output signal from the imaging element and generates various kinds of image data.

A photographer 5 carries the imaging apparatus body 1 over the right shoulder and looks into a finder device 6 with, for example, the right eye. The photographer 5 photographs an object while holding a holding portion of the lens barrel 2 with the right hand 7 to fix the imaging apparatus.

A focus ring 8 which adjusts the focal position of the focus lens is provided at the leading end (object side) of the lens barrel 2 so as to be rotatable in the outer circumferential direction of the lens barrel 2. The photographer 5 can rotate the focus ring by an arbitrary angle with the right hand 7 to adjust the focal position.

A zoom ring 9 which adjusts the zoom position of the zoom lens is provided in a middle portion of the lens barrel 2 so as to be rotatable in the outer circumferential direction of the lens barrel 2. The photographer 5 can rotate the zoom ring 9 by an arbitrary angle with the right hand 7 to adjust a zoom ratio.

An iris ring 11 for adjusting the opening of the iris is provided at the base end of the zoom ring 9 in the lens barrel 2. The iris ring 11 is also provided so as to be rotatable in the outer circumferential direction of the lens barrel 2.

Figure 2:
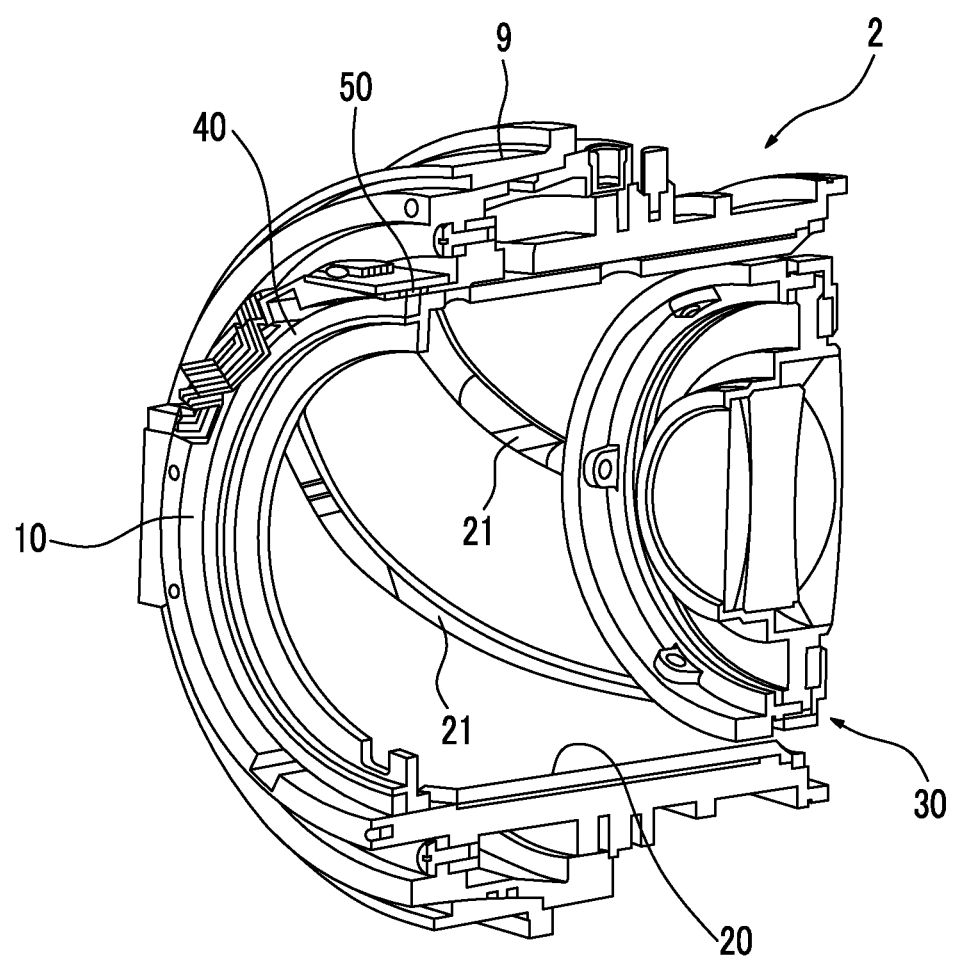
FIG. 2 is a cross-sectional perspective view illustrating a portion of the lens barrel.

FIG. 2 is a cross-sectional perspective view illustrating the vicinity of the zoom ring 9 of the lens barrel 2 illustrated in FIG. 1.

A rotating cylinder 20 (rotating body) which is rotatable about the optical axis of the lens barrel 2 and a zoom lens holding frame 30 which holds the zoom lens provided in the rotating cylinder 20 are provided in the housing 10 having the zoom ring 9 provided in the outer circumference.

The zoom lens holding frame 30 can be moved in the optical axis direction of the lens barrel 2 in operative association with the rotation of the zoom ring 9.

A cam groove 21 for converting a rectilinear motion of the zoom lens holding frame 30 into a rotational motion is formed in the rotating cylinder 20. A protruding portion of the zoom lens holding frame 30 is movably fitted to the cam groove 21. When the zoom lens holding frame 30 is moved in the optical axis direction, the rotating cylinder 20 rotates about the optical axis with the movement of the zoom lens holding frame 30. In this exemplary embodiment, for example, the rotating cylinder 20 can rotate 300 degrees. However, the rotating cylinder 20 may rotate at any angle less than 360 degrees.

A magnetic recording scale member 40 that extends in the circumferential direction of the rotating cylinder 20 is fixed to the outer circumference of the rotating cylinder 20. In this exemplary embodiment, the magnetic recording scale member 40 has a ring shape. However, the magnetic recording scale member 40 may have a shape other than the ring shape. For example, the magnetic recording scale member 40 may have a linear shape with a length corresponding to the rotatable angle of the rotating cylinder 20.

A magnetic sensor device 50 is fixed at a position that faces the magnetic, recording scale member 40 in the housing 10.

Figure 3:
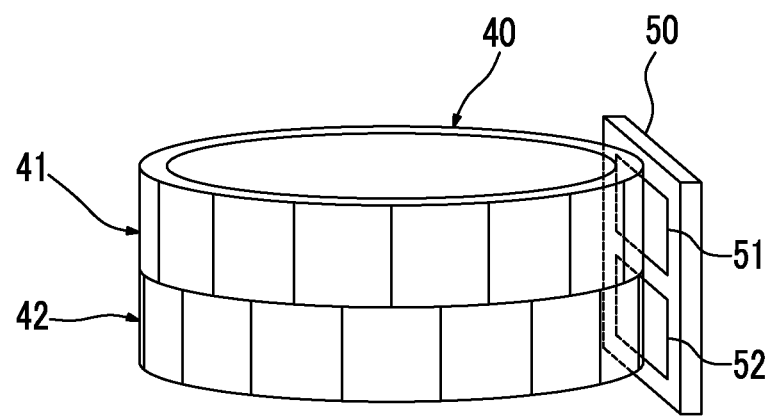
FIG. 3 illustrates a positional relationship between a magnetic scale member and a magnetic sensor device.
Figure 4:
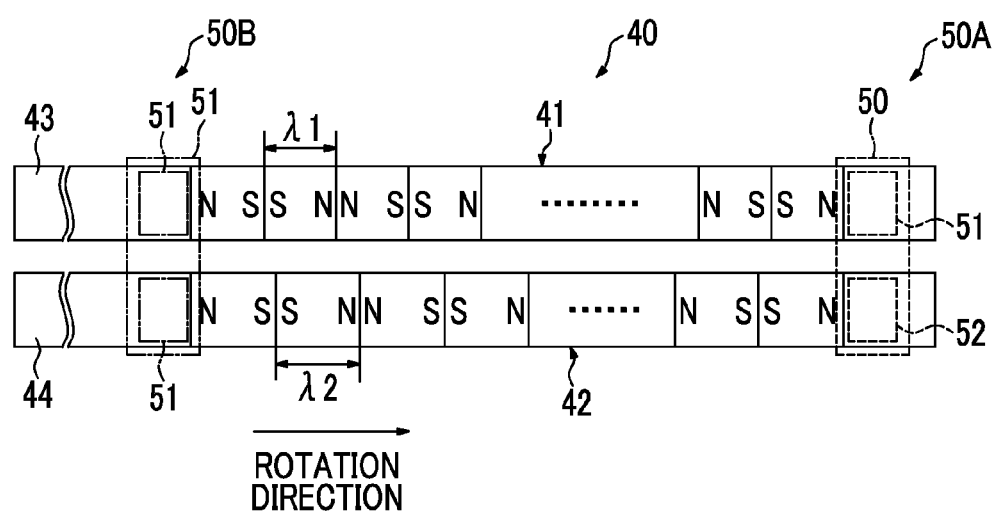
FIG. 4 illustrates a relationship between the magnetic scale member and the magnetic sensor device.

FIG. 3 is an enlarged view illustrating the magnetic recording scale member 40 and the magnetic sensor device 50 illustrated in FIG. 2. FIG. 4 is a development view illustrating the magnetic recording scale member 40 illustrated in FIG. 2.

The magnetic recording scale member 40 includes a first magnetic recording scale 41 and a second magnetic recording scale 42 which are arranged in parallel so as to deviate from each other in the optical axis direction.

As illustrated in FIG. 4, in both the first magnetic recording scale 41 and the second magnetic recording scale 42, magnetic components of the S-pole which is represented by letter S and the N-pole which is represented by letter N are periodically magnetized in supports 43 and 44, respectively. Sine wave information with a wavelength λ1 is recorded as magnetic information on the first magnetic recording scale 41 and sine wave information with a wavelength λ2 greater than the wavelength λ1 is recorded as magnetic information on the second magnetic recording scale 42.

The magnetic sensor device 50 includes a first magnetic sensor 51 that is provided at a position facing the first magnetic recording scale 41 and a magnetic sensor 52 that is provided at a position facing the second magnetic recording scale 42.

The first magnetic sensor 51 includes two magneto-resistive effect elements whose electric resistance is changed depending on the magnetic field applied, detects a sine wave signal with the wavelength λ1 and a cosine wave signal having a phase shift of, for example, 90° with respect to the sine wave signal from the magnetic information recorded on the first magnetic recording scale 41, and outputs the detected signals. Similarly, the second magnetic sensor 52 includes two magneto-resistive effect elements whose electric resistance is changed depending on the magnetic field applied, detects a sine wave signal with the wavelength λ2 and a cosine wave signal having a phase shift of, for example, 90° with respect to the sine wave signal from the magnetic information recorded on the second magnetic recording scale 42, and outputs the detected signals.

In FIG. 4, the position of the magnetic sensor device 50 relative to the magnetic recording scale member 40 when the rotation angle of the rotating cylinder 20 is 0° (for example, the zoom lens is disposed at the wide end) is represented by a dashed line indicated by an arrow 50A. When the rotating cylinder 20 is rotated, the magnetic sensor device 50 relatively moves from the position represented by the dashed line indicated by the arrow 50A in FIG. 4 to the left. When the rotation angle of the rotating cylinder 20 is 300°, the magnetic sensor device 50 is relatively disposed at the position represented by a chain line indicated by an arrow 50B.

Figure 5:
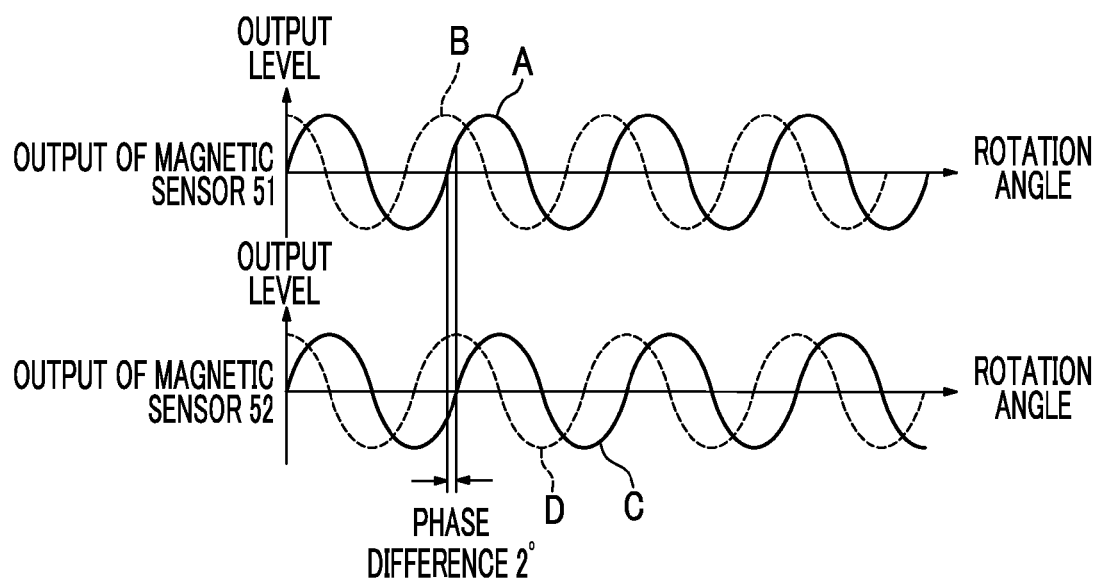
FIG. 5 is a diagram illustrating the waveforms of signals output from the magnetic sensor device.

FIG. 5 is a diagram illustrating the waveforms of signals output from the magnetic sensor device 50 when the rotating cylinder 20 illustrated in FIG. 2 is rotated.

In FIG. 5, waveforms represented by letters A and B thereinafter, referred to as an A-phase and a B-phase) are signal waveforms which are output from the first magnetic sensor 51 facing the first magnetic recording scale 41. The B-phase has a phase shift of 90° with respect to the A-phase. That is the A-phase is an example of a first phase signal and the B-phase is an example of a second phase signal.

In FIG. 5, waveforms represented by letters C and D (hereinafter, referred to as a C-phase and a D-phase) are signal \waveforms which are output from the second magnetic sensor 52 facing the second magnetic recording scale 42. The C-phase has the same phase as the A-phase at the beginning. However, the C-phase leads the A-phase by 2° in every cycle (one pulse). In addition, the D-phase has a phase shift of 90° with respect to the C-phase. That is, the C-phase is an example of a third phase signal and the D-phase is an example of a fourth phase signal.

In this exemplary embodiment, the first magnetic recording scale 41 and the second magnetic recording scale 42 are magnetized such that 150 pulses of the A-phase and the B-phase are output and 149 pulses of the C-phase and the D-phase are output while the rotating cylinder 20 is being rotated 300°.

When the lens diameter of a general broadcasting lens device is considered, the diameter φ of the first magnetic recording scale 41 and the second magnetic recording scale 42 is about 80 mm in practice. The wavelength λ1 and the wavelength λ2, which are magnetization pitches, may be respectively about 1.40 mm and 1.41 mm in order to obtain the above-mentioned number of pulses with the diameter.

Figure 6:
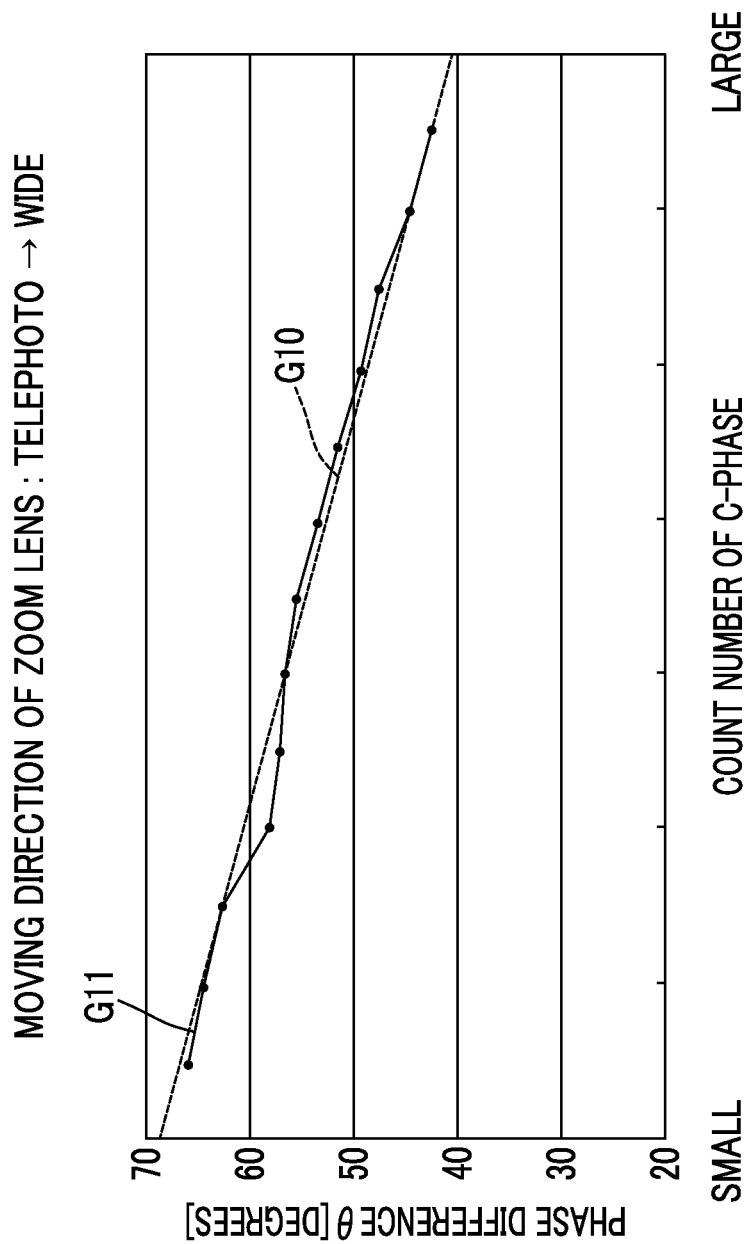
FIG. 6 illustrates a relationship between a phase difference and the count number of a C-phase.
Figure 7:
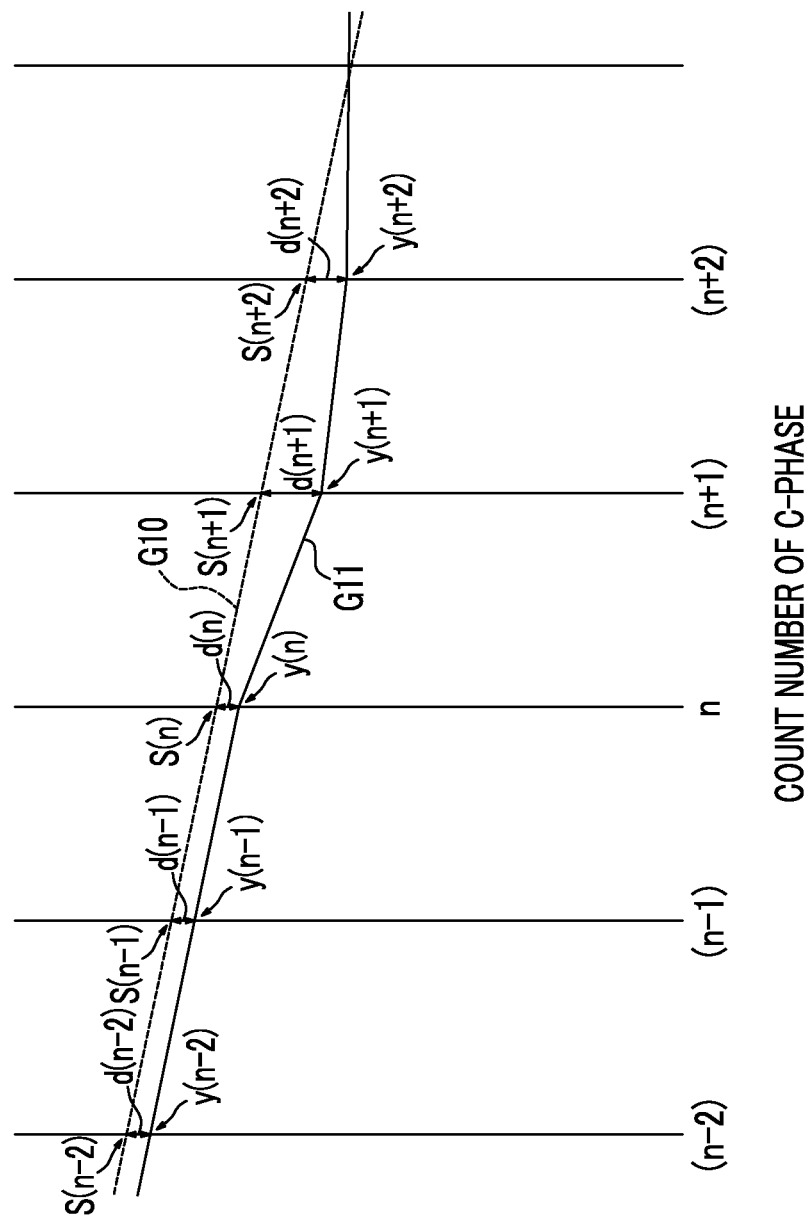
FIG. 7 illustrates the relationship between the phase difference and the count number of the C-phase.

FIG. 6 illustrates a portion of the relationship between the count number of the C-phase and a phase difference θ between the A-phase and the C-phase when the zoom lens is moved from a telephoto side to a wide side. FIG. 7 is an enlarged view illustrating a portion of FIG. 6.

In FIG. 6, the horizontal axis is the count number of the C-phase and the vertical axis is the phase difference θ between the A-phase and the C-phase. The phase difference θ between the A-phase and the C-phase is obtained by, for example, arctan(A/B)-arctan(C/D) A, B, C, and D are the signal levels of each phase which are obtained at an arbitrary time). The count number of the C-phase corresponds to the rotation angle of the zoom lens holding frame 30 (therefore, corresponds to the position of the zoom lens). When the phase difference θ is known, the count number of the C-phase, that is, the position of the zoom lens is known.

In FIG. 6, a dashed line G10 indicates an ideal design value without any error. The phase difference θ decreases gradually as the count number of the C-phase increases. In FIG. 6, a solid line G11 indicates an actual value when the magnetic recording scale member 40 which is magnetized as described above is rotated. For example, when the magnetic recording scale member 40 is actually provided in the lens barrel 2, uneven magnetization occurs. Therefore, the relationship between the phase difference θ and the count number of the C-phase is not equal to the ideal design value.

It is assumed that, for example, the phase differences θ at the ideal design values when the count numbers are (n−2), (n−1), n, (n+1), and (n+2) are S(n−2), S(n−1), S(n), S(n+1), and S(n+2), respectively, with reference to FIG. 7. However, the actual phase differences θ when the count numbers are (n−2), (n−1), n, (n+1), and (n+2) are y(n−2), y(n−1), y(n), y(n+1), and y(n+2), respectively.

The differences between the design values and the actual phase differences θ when the count numbers are (n−2), (n−1), n, (n+1), and (n+2) are d(n−2), d(n−1), d(n), d(n+1), and d(n+2), respectively.

In this exemplary embodiment, as represented by a graph G10, data indicating the relationship between the count number and the phase difference θ at the ideal design value is stored in advance and the difference between the phase difference θ and the design value is stored as the amount of correction for each phase difference in advance. In particular, in this exemplary embodiment, for the amount of correction indicating the difference between the phase difference θ and the design value, the average of the amounts of correction of the phase differences corresponding to five consecutive count numbers is stored.

FIG. 8 illustrates an example of a correction table storing the amount of correction.

FIG. 8 illustrates the correction table used when the zoom lens is moved from the telephoto side to the wide side, similarly to FIGS. 6 and 7.

As described above, the average of five differences between the phase differences θ corresponding to five consecutive count numbers and design values is stored in the correction table.

Referring to FIG. 8, when the phase differences are y(n−2), y(n−1), y(n), y(n+1), and y(n+2), the amounts of correction are Δ(n−2), Δ(n−1), Δ(n), Δ(n+1), and Δ(n+2), respectively. Referring to FIG. 7, when the phase difference is y(n), the amount of correction Δ(n) is Δ(n)={d(n−2)+d(n−1)+d(n)+d(n+1)+d(n+2)}/5. The amounts of correction which are stored so as to be associated with the other phase differences are obtained by the same method as described above.

In this exemplary embodiment, the average of five differences between the design values and the phase differences θ corresponding to five consecutive count numbers is used as the amount of correction. Therefore, even when an error occurs, averaging is performed to detect the position of the zoom lens with high accuracy. In addition, the average of five differences between the design values and the phase differences θ corresponding to five consecutive count numbers may not be used as the amount of correction.

Figure 9:
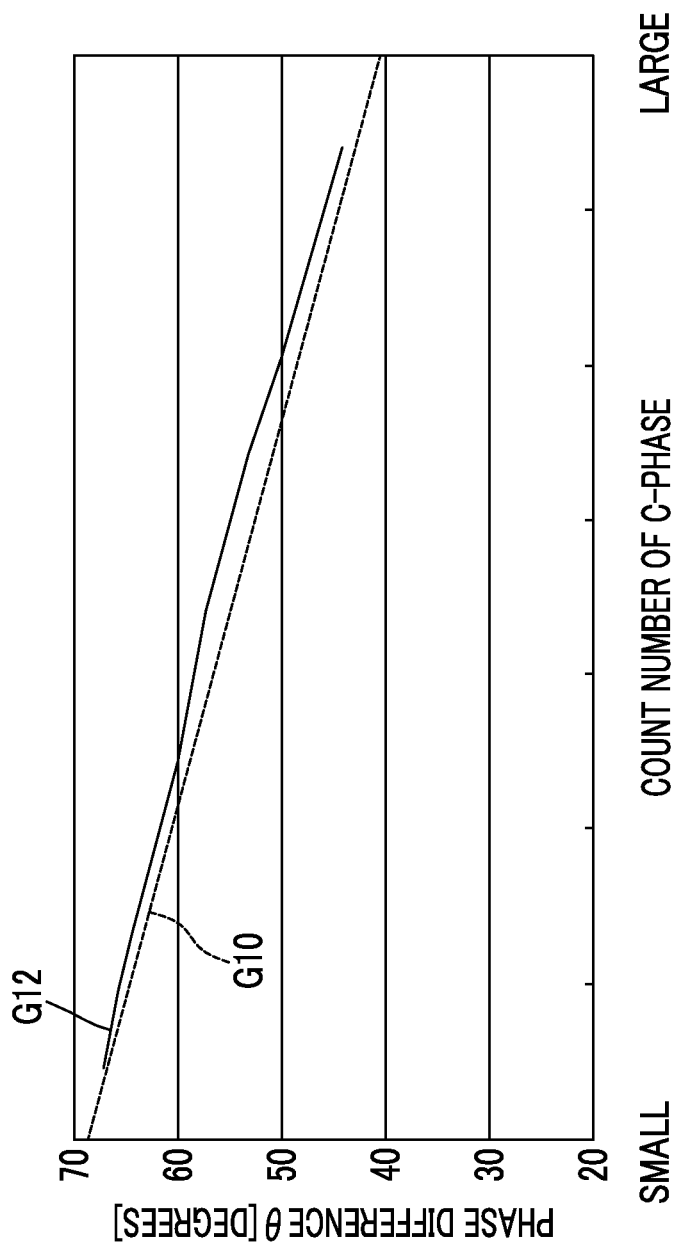
FIG. 9 illustrates the relationship between the phase difference and the count number of the C-phase.

FIG. 9 illustrates a portion of the relationship between the count number of the C-phase and the phase difference θ between the A-phase and the C-phase when the zoom lens is moved from the wide side to the telephoto side, contrary to the case illustrated in FIG. 6.

FIG. 9 illustrates a graph G10 of the design Values in addition to a graph G12 obtained when the zoom lens is actually moved from the wide side to the telephoto side.

The relationship between the count number and the phase difference θ when the zoom lens is moved from the telephoto side to the wide side is not completely identical to that when the zoom lens is moved from the wide side to the telephoto side. Therefore, in this exemplary embodiment, the above-mentioned correction is performed according to the moving direction of the zoom lens.

FIG. 10 illustrates a correction table used when the zoom lens is moved from the wide side to the telephoto side.

In the table illustrated in FIG. 10, the amount of correction is stored so as to be associated with the phase difference, similarly to the table illustrated in FIG. 8.

Figure 11:
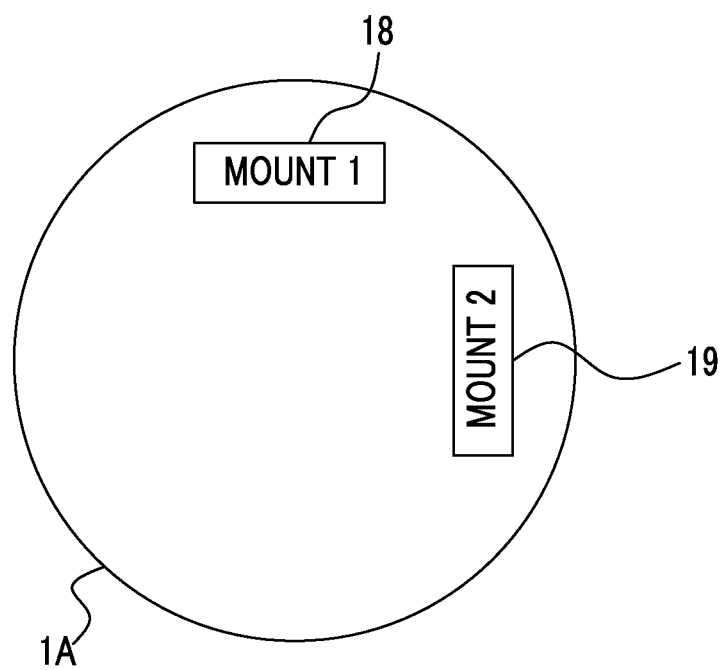
FIG. 11 illustrates a mount portion of an imaging apparatus body.

FIG. 11 illustrates the shape of a mount portion 1A of the imaging apparatus body 1, as viewed from a rear surface.

The mount portion 1A of the imaging apparatus body 1 according to this exemplary embodiment includes a first mount 18 and a second mount 19 as mounts which can be affixed to the lens barrel 2. When the second mount 19 is used to mount the lens barrel 2 to the imaging apparatus body 1, the lens barrel 2 is rotated by a predetermined angle (for example, 90 degrees clockwise from the rear surface to the front surface) about the optical axis, as compared to when the first mount 18 is used to mount the lens barrel 2 to the imaging apparatus body 1.

Figure 12:
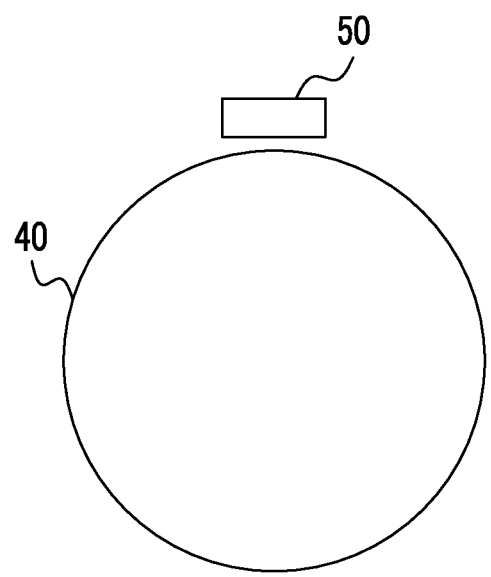
FIG. 12 illustrates an aspect in which the magnetic sensor device is position on the upper side and the lens barrel is mounted to the imaging, apparatus body.

FIG. 12 illustrates the position of the magnetic sensor device 50 when the first mount 18 is used to mount the lens barrel 2 to the imaging apparatus body 1.

When the first mount 18 is used to mount the lens barrel 2 to the imaging apparatus body 1, the magnetic sensor device 50 is positioned on the upper side, as illustrated in FIG. 12. For example, as described above, the magnetic recording scale member 40 is rotatable in the range of 0 degrees to 300 degrees.

It is assumed that the correction tables illustrated in FIGS. 8 and 10 are created, for example, in the state illustrated in FIG. 12.

Figure 13:
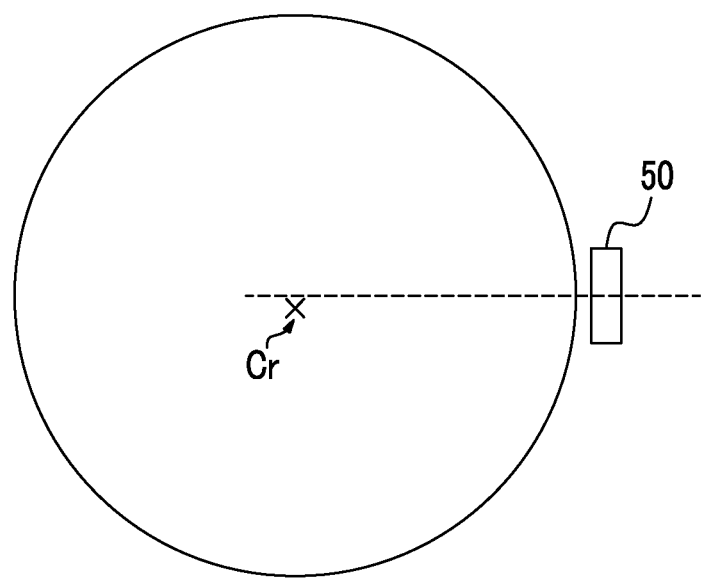
FIG. 13 illustrates an aspect in which the magnetic sensor device is position on the side and the lens barrel is mounted to the imaging apparatus body.

FIG. 13 illustrates the position of the magnetic sensor device 50 when the second mount 19 is used to mount the lens barrel 2 to the imaging apparatus body 1.

When the second mount 19 is used to mount the lens barrel 2 to the imaging apparatus body 1, the magnetic sensor device 50 is rotated by 90 degrees clockwise about the optical axis and is positioned. In this case, the magnetic recording scale member 40 is also rotatable in the range of 0 degrees to 300 degrees.

While the magnetic sensor device 50 is fixed to the housing 10 of the lens barrel 2, the magnetic recording scale member 40 is rotatably supported by the rotating cylinder 20. The rotating cylinder 20 deviates to the lower side due to the influence of gravity. Therefore, the center Cr of the magnetic recording scale member 40 deviates from the center of the magnetic sensor device 50 to the lower side. As illustrated in FIG. 8, when the amount of correction is defined in correspondence with the phase difference obtained by the rotation of the magnetic recording scale member 40 and correction is performed using the amount of correction, the phase difference is not detected from the A-phase and the B-phase and the C-phase and the D-phase which correspond to the A-phase and the B-phase, but is detected from the previous A-phase, the previous B-phase, the C-phase, and the B-phase. Therefore, in this exemplary embodiment, when correction is performed using the correction table, it is performed using the amount of correction corresponding to a phase difference (corrected phase difference) corresponding to the phase difference (the rotation direction from 0 degrees to 300 degrees is a positive direction) immediately before the actually detected phase difference. It is possible to perform accurate correction eve when the position of the magnetic sensor device 50 is different from that when the correction table is created.

As illustrated in FIG. 12, even when the lens barrel 2 is mounted to the imaging apparatus body 1 such that the magnetic sensor device 50 is disposed on the upper side, the magnetic recording scale member 40 deviates to the lower side. However, unlike the case illustrated in FIG. 13, the magnetic recording scale member 40 does not deviate from the magnetic sensor device 50 in the circumferential direction. Therefore, it is not necessary to use the phase difference immediately before the actually detected phase difference.

When the correction table is created in the state illustrated in FIG. 13 and correction is performed using the correction table in the state illustrated in FIG. 13, it is not necessary to correct the phase difference. However, when correction is performed using the correction table in the state illustrated in FIG. 12, it is necessary to correct the phase difference. In this case, when correction is performed using the correction table, it is performed using the amount of correction corresponding to a phase difference (corrected phase difference) corresponding to the phase difference immediately after the actually detected phase difference.

Figure 14:
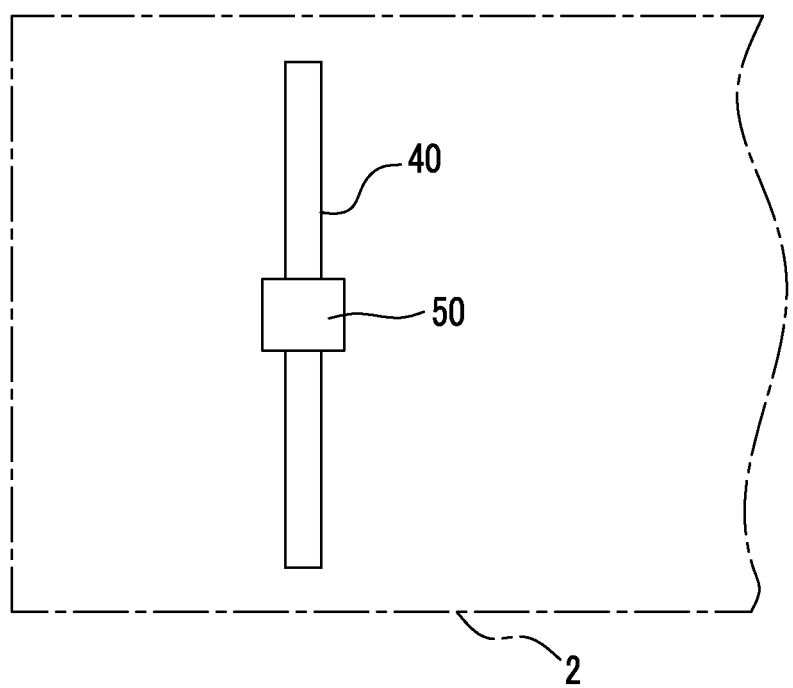
FIG. 14 is a side view illustrating a lens barrel.
Figure 15:
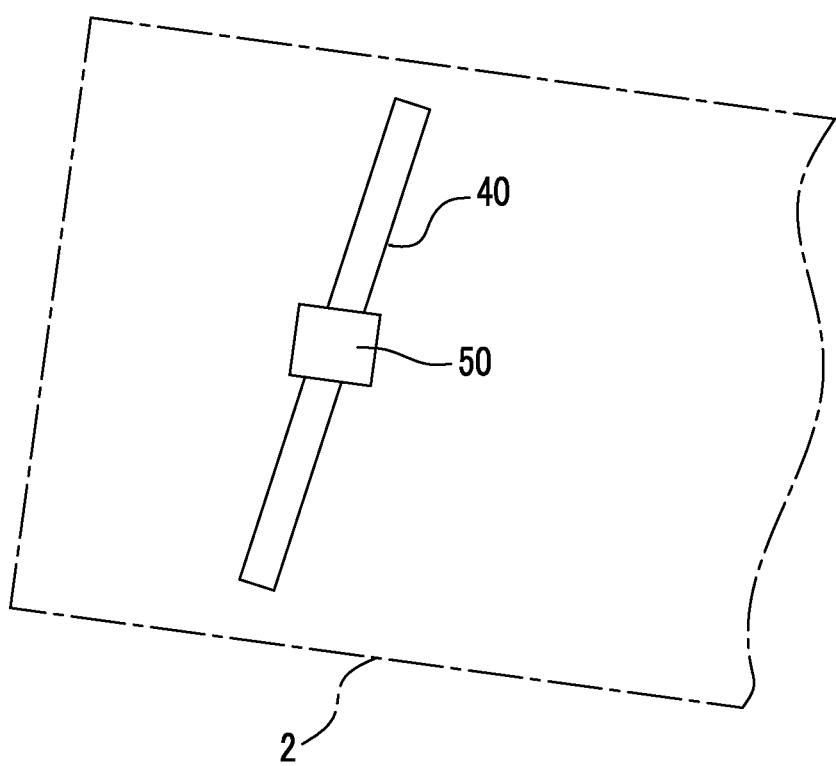
FIG. 15 is a side view illustrating the lens barrel.

FIGS. 14 and 15 illustrate the positional relationship between the magnetic recording scale member 40 and the magnetic sensor device 50 and illustrates the lens barrel 2, as viewed from the side. FIGS. 14 and 15 both illustrate the case in which the second mount 19 is used to mount the lens barrel 2 to the imaging apparatus body 1, as illustrated in FIG. 13.

FIG. 14 illustrates the horizontal state of the lens barrel 2. When the lens barrel 2 is in the horizontal state, the magnetic sensor device 50 is arranged in parallel to the magnetic recording scale member 40. Therefore, as described above, an accurate phase difference is calculated.

FIG. 15 illustrates a state in which the lens barrel is inclined.

Since the magnetic sensor device 50 is fixed to the housing 10 of the lens barrel 2, it is inclined in correspondence with the inclination of the lens barrel 2. In contrast, as described above, the magnetic recording scale member 40 is fixed to the rotating body 20 and the zoom lens which has the center of gravity on the rear side is attached to the rotating body. Therefore, the inclination of the magnetic recording scale member 40 is greater than that of the lens barrel 2 due to the weight of the zoom lens. For this reason, when the lens barrel 2 is inclined, the magnetic sensor device 50 does not vertically intersect the magnetic recording scale member 40.

Figure 16:
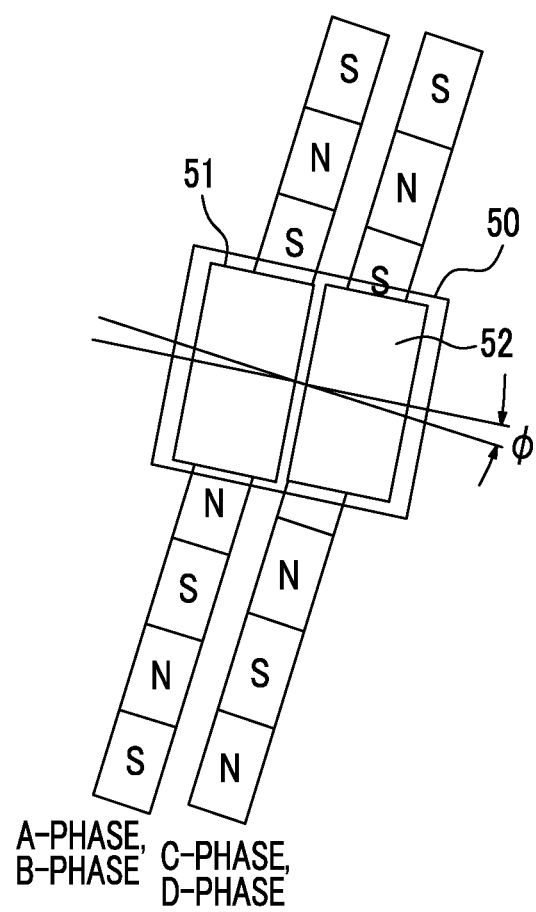
FIG. 16 illustrates a relationship between the magnetic sensor device and a magnetic recording scale.

FIG. 16 illustrates the relationship between the magnetic sensor device 50 and the magnetic recording scale member 40 illustrated in FIG. 15.

When the lens barrel 2 is inclined, the magnetic sensor device 50 is not parallel to the magnetic recording scale member 40, but deviates from the magnetic recording scale member 40 by an angle φ. Therefore, the magnetic sensor device 50 faces a magnetic pole adjacent to a target magnetic pole. As a result, an accurate phase difference is unlikely to be detected, as described above.

In this exemplary embodiment, the amount of inclination is calculated and the calculated phase difference is corrected using the amount of inclination, if necessary.

Figure 17:
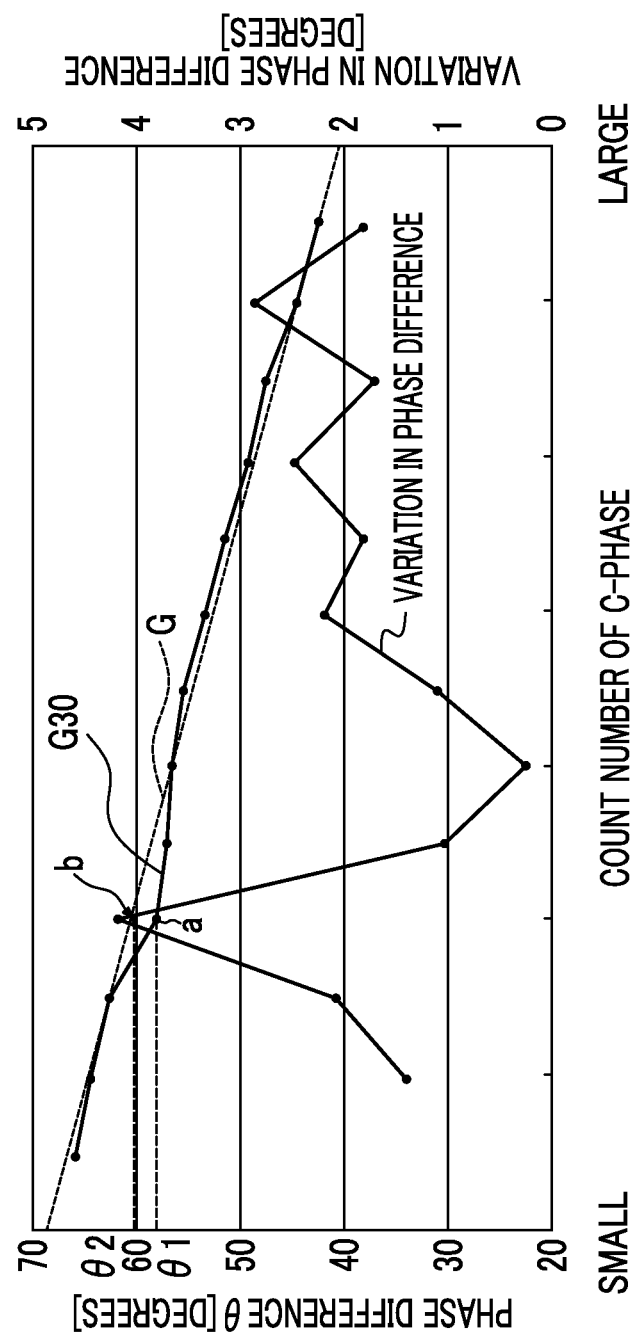
FIG. 17 illustrates the relationship between the phase difference and the count number of the C-phase.

FIG. 17 illustrates the relationship between the phase difference and the count number of the C-phase when the position of the zoom lens is actually detected. FIG. 17 also illustrates a variation in the phase difference corresponding to the count number of the C-phase.

A graph G indicates a design phase difference value and the count number of the C-phase. A graph G30 indicates the relationship between the phase difference and the count number obtained according to the movement of the zoom lens when the phase difference is actually corrected.

The relationship between the phase difference and the count number obtained according to the movement of the zoom lens at time of the correction is not identical to a design relationship. For example, when a phase difference θ1 is obtained as represented by a point a and the count number of the C-phase (the position of the zoom lens) is calculated on the basis of the phase difference θ1, using the graph G, a position P2 is calculated as the position of the zoom lens even though the actual position of the zoon lens is a position P1. This error may not be corrected even though the correction process is performed.

Therefore, in this exemplary embodiment, the phase difference θ is calculated for each of the five count numbers of the C-phase when the number of counts is two or more, it may not be five) and the average value of the calculated phase differences θ is calculated. Then, the position of the zoom lens is detected from the average phase difference.

In FIG. 17, the average value of a total of five phase differences, that is, the phase difference θ1 and four phase differences before and after the phase difference θ1 is calculated. When the average value is replaced with the phase difference θ1 at the point a, the phase difference at the point a becomes a phase θ2 at a point b and is close to the design value. Therefore, when the average value θ2 is used, it is possible to improve the detection accuracy of the position of the zoom lens.

Figure 18:
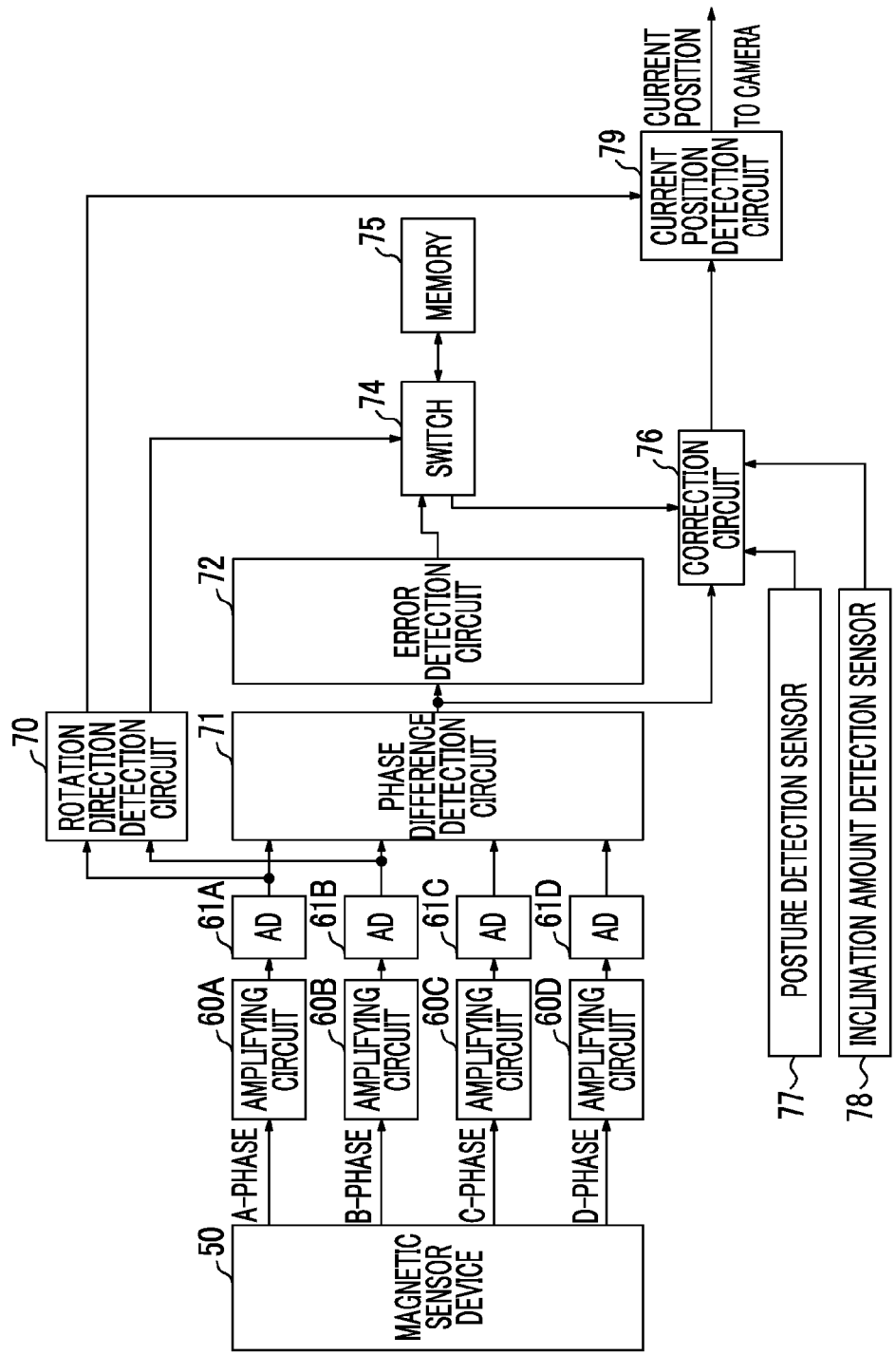
FIG. 18 is a block diagram illustrating the electrical structure of at zoom lens position detection circuit.

FIG. 18 is a block diagram illustrating the electrical structure of a circuit for detecting the position of the zoom lens holding frame 30 (zoom lens) illustrated in FIG. 2. The circuit illustrated in FIG. 18 is provided in the lens barrel 2.

First, a method for generating the correction tables illustrated in FIGS. 8 and 10 as described above will be described.

At time of the factory shipment of the lens barrel 2, the zoom ring 9 is rotated such that the zoom lens moves from the telephoto side to the wide side. Then, as described above, the A-phase signal and the B-phase signal are output from the first magnetic sensor 51 of the magnetic sensor device 50 and the C-phase signal and the D-phase signal are output from the second magnetic sensor 52.

The A-phase signal and the B-phase signal output from the first magnetic sensor 51 are input to a first amplifying circuit 60A and a second amplifying circuit 60B, respectively, and are then amplified. The amplified A-phase signal and B-phase signal are convened into digital A-phase data and digital B-phase data by analog/digital conversion circuits 61A and 61B, respectively. The converted A-phase data and B-phase data are input to a phase difference detection circuit 71 and a rotation direction detection circuit 70. The rotation direction detection circuit 70 detects the rotation direction of the zoom ring 9 (that is, the moving direction of the zoom lens) from the input A-phase data and B-phase data.

The C-phase signal and the D-phase signal output from the second magnetic sensor 52 are input to a third amplifying circuit 60C and a fourth amplifying circuit 601, respectively. The amplified C-phase signal and D-phase signal are converted into digital C-phase data and digital D-phase data by analog/digital conversion circuits 61C and 61D, respectively. The converted C-phase data and D-phase data are input to the phase difference detection circuit 71.

As described above, the phase difference detection circuit 71 periodically detects the phase difference θ between the A-phase and the C-phase. As described above, the value of arctan(A/B)-arctan(C/D) (A, B, C, and D are the levels of each phase which are acquired at an arbitrary time) is calculated and the phase difference θ is calculated. That is, the phase difference detection circuit 71 functions as an example of the phase difference calculation section.

Data indicating the detected phase difference θ is input to an error detection circuit 72. The error detection circuit 72 obtains data indicating the difference between the design value and the phase difference. The data indicating the difference between the design value and the phase difference is input to a memory 75. The amounts of correction corresponding to different phase differences are obtained and the correction table illustrated in FIG. 8 is stored in the memory 75.

Then, the zoom lens is moved from the wide side to the telephoto side and the correction table illustrated in FIG. 10 is obtained as described above. The obtained correction table is also stored in the memory 75. That is, the memory 75 functions as an example of a correction table memory.

Next, the correction process will be described with reference to FIG. 18.

When the zoom ring 9 is rotated during the actual use of the lens barrel 2, the A-phase data, the B-phase data, the C-phase data, and the D-phase data are obtained as described above and the rotation direction detection circuit 70 detects the rotation direction. Whether the zoom lens is moved from the telephoto side to the wide side or from the wide side to the telephoto side is known from the detected rotation direction. A correction table corresponding to the rotation direction (the moving direction of the zoom lens) detected by the rotation direction detection circuit 70 passes through a switch circuit 74. For example, when the moving direction of the zoom lens is from the telephoto side to the wide side, the correction table illustrated in FIG. 8 is input to a correction circuit 76 through the switch circuit 74 when the moving direction of the zoom lens is from the wide side to the telephoto side, the correction table illustrated in FIG. 10 is input to the correction circuit 76 through the switch circuit 74.

Data indicating the phase difference θ output from the phase difference detection circuit 71 is also input to the correction circuit 76 and the correction circuit 76 corrects the input data indicating the phase difference θ with the correction table. That is, the correction circuit 76 functions as an example of the phase difference correction section. The corrected data indicating the phase difference θ is input to a current position detection circuit 79 and the current position of the zoom lens is detected on the basis of a graph G10 indicating the relationship between the phase difference and the count number of the C-phase at the ideal design value. A method for detecting the current position of the zoom lens will be described below.

The lens barrel 2 according to this exemplary embodiment further include a posture detection sensor 77 and an inclination amount detection sensor 78. As described with reference to FIGS. 1 to 13, the posture detection sensor 77 detects whether the lens barrel 2 is mounted to the first mount 18 or the second mount 19. As described with reference to FIGS. 14 and 15, the inclination amount detection sensor 78 detects the amount of inclination of the lens barrel 2. That is, the inclination amount detection sensor 78 functions as the inclination amount detection section.

As described above, when the posture detection sensor 77 detects that the lens barrel 2 is mounted to the first mount 18, correction is performed using the amount of correction corresponding to the detected phase difference among the amounts of correction stored in the correction table corresponding to the rotation direction. On the other hand, when the posture detection sensor 77 detects that the lens barrel 2 is mounted to the second mount 19, correction is performed using the amount of correction corresponding to the phase difference immediately before the detected phase difference, as described above.

When the inclination amount detection sensor 78 detects that the lens barrel 2 is horizontal and is not inclined as illustrated in FIG. 14, correction is performed using the amount of correction corresponding to the detected phase difference among the amount of corrections stored in the correction table corresponding to the rotation direction. On the other hand, when the inclination amount detection sensor 78 detects that the lens barrel 2 is inclined as illustrated in FIG. 15, correction is performed using the amount of correction corresponding to a phase difference that is a value corresponding to the inclination amount before the detected phase difference. The inclination amount and the amount of correction corresponding to the phase difference which is used depending on the inclination amount are predetermined.

When the posture detection sensor 77 detects that the lens barrel 2 is mounted to the second mount 19 and the inclination amount detection sensor 78 detects that the lens barrel 2 is inclined, correction is performed using the amount of correction corresponding to a phase difference that is a value corresponding to the inclination amount before the detected phase difference, in addition to the phase difference immediately before the detected phase difference.

Figure 19:
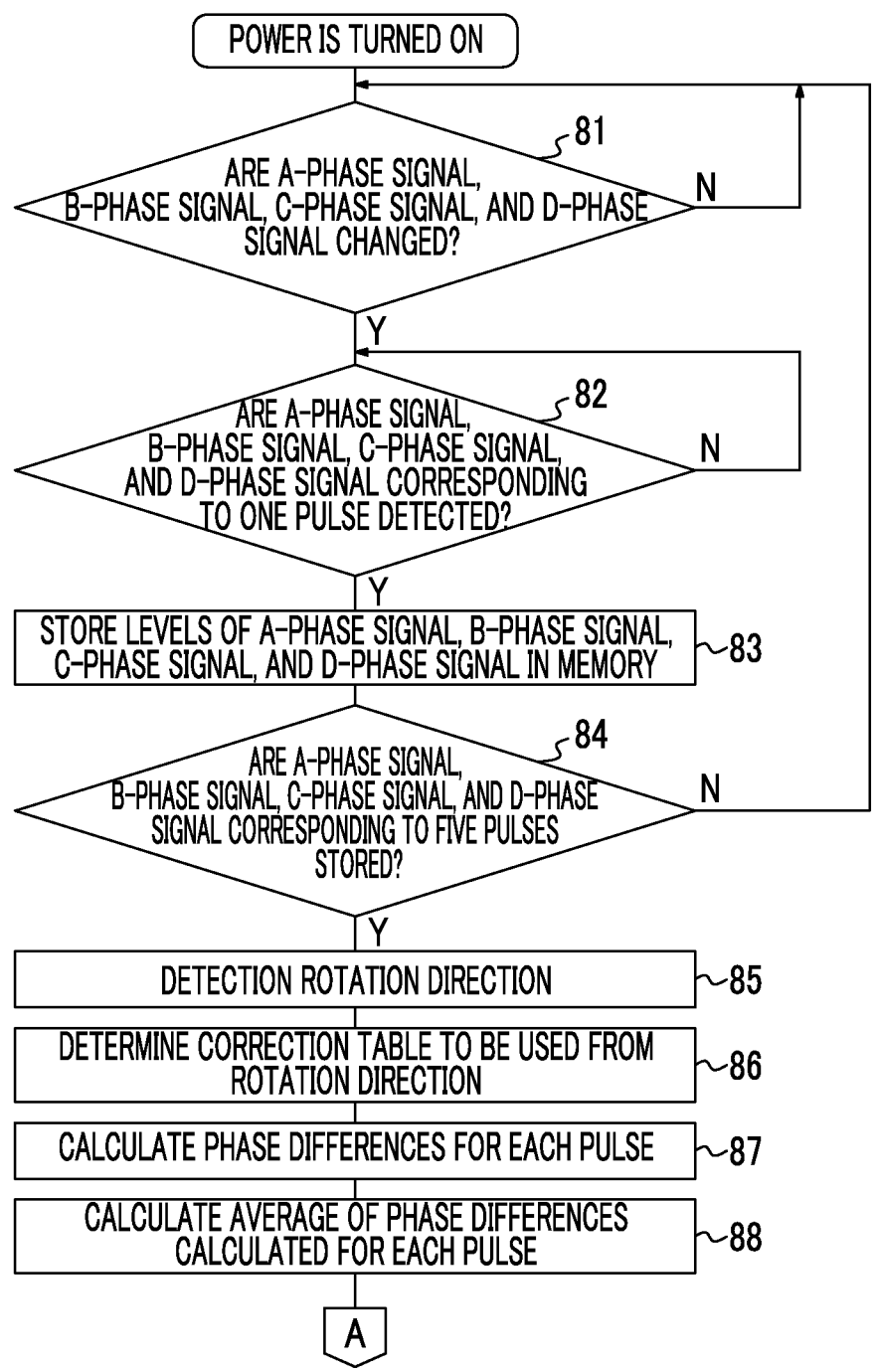
FIG. 19 is a flowchart illustrating the procedure of a zoom lens position detection process.
Figure 20:
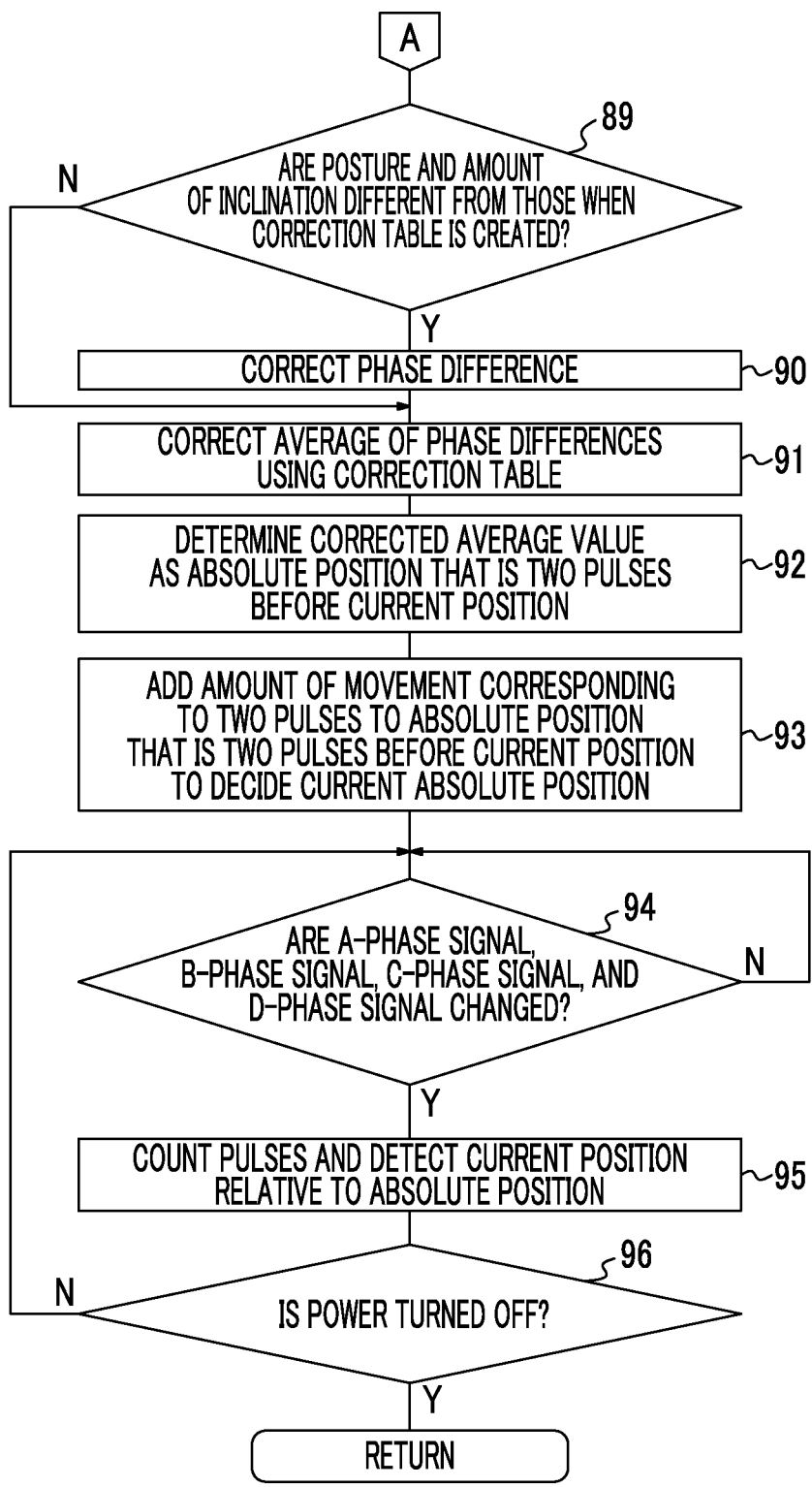
FIG. 20 is a flowchart lustrating the procedure of the zoom lens position detection process.

FIGS. 19 and 20 are flowcharts illustrating the procedure of a zoom lens position detection process. FIG. 21 is a diagram illustrating the waveforms of signals output from the magnetic sensor device 50 when the zoom ring 9 is rotated in one direction. When the rotation direction of the zoom ring 9 is changed, the method is performed from the initial process illustrated in FIG. 19.

When the user turns on the lens barrel, A-phase data, B-phase data, C-phase data, and D-phase data corresponding to the current position of the zoom lens are output from the analog/digital conversion circuits 61A, 61B, 61C, and 61D, respectively. It is assumed that power is turned on at a time T0 illustrated in FIG. 21.

When power is turned on, the phase difference detection circuit 71 checks whether the A-phase data, the B-phase data, the C-phase data, and the D-phase data are changed (Step 81). When the user rotates the zoom ring 9 in one direction after power is turned on and the A-phase data, the B-phase data, the C-phase data, and the D-phase data are changed (YES in Step 81), the phase difference detection circuit 71 determines whether the A-phase data, the B-phase data, the C-phase data, and the D-phase data corresponding to one cycle (one pulse) are detected (Step 82). When the A-phase data, the B-phase data, the C-phase data, and the D-phase data corresponding to one cycle (one pulse) are detected, the A-phase data, the B-phase data, the C-phase data, and the D-phase data corresponding to one cycle (one pulse) are normalized and stored in a memory (not illustrated) included in the phase difference detection circuit 71 (Step 83).

When the A-phase data, the B-phase data, the C-phase data, and the D-phase data corresponding to five pulses are not stored in the memory of the phase difference detection circuit 71 (NO in Step 84), the process is repeated from Step 81.

When the A-phase data, the B-phase data, the C-phase data, and the D-phase data corresponding to five pulses are stored in the memory of the phase difference detection circuit 71 (YES in Step 84), the rotation direction detection circuit 70 detects the rotation direction of the zoom ring, 9 (Step 85). The correction table which is used for correction as described above is determined on the basis of the detected rotation direction (Step 86).

Then, the value of arctan(A/B)-arctan(C/D) is calculated for each of the A-phase data, the B-phase data, the C-phase data, and the D-phase data corresponding to five pulses, using the A-phase data, the B-phase data, the C-phase data, and the D-phase data obtained at an arbitrary time (for example, at the time when the amplitude of the A-phase is (1 degrees) and the phase difference θ is calculated for each of the five pulses (Step 87).

For example, as illustrated in FIG. 21, the phase difference detection circuit 71 calculates the phase differences θ(1), θ(2), θ(3), θ(4), and θ(5) for each of the first to fifth pulses that are output after power is turned on, using the A-phase data, the B-phase data, the C-phase data, and the D-phase data which are obtained at the times T1, T2, T3, T4, and T5, respectively.

Then, the phase difference detection circuit 71 calculates the average value of the phase differences θ(1) to θ(5) (Step 88).

As described above, the posture detection sensor 77 checks whether the posture of the lens barrel 2 is different from that when the correction table is created and the inclination amount detection sensor 78 checks whether the amount of inclination of the lens barrel 2 is different from that when the correction table is created (Step 89). When both the posture and inclination amount of the lens barrel 2 are different from those when the correction table is created (NO in Step 89), the amount of correction corresponding to a phase difference which corresponds to the calculated average value of the phase differences among the phase differences stored in the determined correction table is read from the determined correction table, as described above (Step 91).

On the other hand, when at least one of the posture and inclination amount of the lens barrel 2 is different from that when the correction table is created (YES in Step 89), the amount of correction corresponding to a phase difference before the phase difference which corresponds to the calculated average value of the phase differences among the phase differences stored in the determined correction table is read from the determined correction table, as described above (Step 90)(the correction of the phase difference).

The average value of the phase differences corrected by the read amount of correction (the correction of the phase difference detected by the phase difference detection circuit 71) is the phase difference in the third pulse. The absolute position of the zoom lens (the absolute position that is two pulses before the current position) corresponding to the phase difference in the third pulse is determined from the phase difference in the third pulse and data in which the design phase difference value stored in the memory 75 is associated with the position of the zoom lens (Step 92).

Then, the current position detection circuit 79 adds or subtracts the amount of movement corresponding to two pulses to or from the determined absolute position in the rotation direction (the moving direction of the zoom lens) output from the rotation direction detection circuit 70 to decide the absolute position of the zoom lens (Step 93).

For example, when the moving direction of the zoom lens is a direction in which the phase difference θ is changed from a small value to a large value, the current position detection circuit 79 adds the amount of movement corresponding to two pulses to the determined absolute position to decide the absolute position. On the other hand, when the moving direction of the zoom lens is a direction in which the phase difference θ is changed from a large value to a small value, the current position detection circuit 79 substrates the amount of movement corresponding to two pulses from the determined absolute position to decide the absolute position. That is, the current position detection circuit 79 functions as an example of the absolute position calculation section.

The current position detection circuit 79 may output the decided absolute position to a display unit connected to the imaging apparatus body 1 to notify the user of the absolute position.

Then, when the A-phase data and the B-phase data are changed (YES in Step 94), the rotation direction detection circuit 70 compares the A-phase data and the B-phase data to determine the moving direction of the zoom lens, counts the number of pulses of the A-phase data or the B-phase data (for example, the number of pulses at 64-multiplied accuracy), and detects the relative position of the zoom lens having the decided absolute position as a reference position (Step 95).

When the lens barrel 2 is turned off (YES in Step 96), the process ends.

In the lens barrel 2 according to this exemplary embodiment, the current position of the zoom lens is determined on the basis of the corrected value of the average value of the phase differences which are calculated for each of the five pulses output from the magnetic sensor device 50. Therefore, the influence of the uneven magnetization of the magnetic recording scale member 40 or the assembly error of the lens barrel 2 is reduced and it is possible to improve the detection accuracy of the current position.

In the above description of the operation, the average value of the phase differences corresponding to five pulses is used. However, when the average value of the phase differences corresponding to seven pulses is used, the corrected value of the average value of the phase differences $\theta$ which are calculated for each of the seven pulses may be treated as a phase difference corresponding to the fourth pulse and the absolute position of the zoom lens in the fourth pulse may be calculated on the basis of the phase difference. Then, a position that deviates from the absolute position by three pulses may be decided as the absolute position.

When the average value of the phase differences corresponding to four pulses is used, the corrected value of the average value of the phase differences $\theta$ which are calculated for each of the four pulses may be treated as a phase difference corresponding to the second or third pulse and the absolute position of the zoom lens in the second or third pulse may be calculated on the basis of the phase difference. Then, a position that deviates from the absolute position by one or two pulses may be decided as the absolute position.

When odd-number pulses are used to calculate the average value of the phase differences, the phase difference detection circuit 71 shifts the absolute position corresponding to the corrected value of the average value of the phase differences $\theta$ which are calculated for each of the pulses by the quotient when the number of pulses is divided by 2 to decide the final absolute position. When even-number pulses are used, the phase difference detection circuit 71 shifts the absolute position corresponding to the corrected value of the average value of the phase differences $\theta$ which are calculated for each of the pulses by "the quotient when the number of pulses is divided by 2" or "(the quotient when the number of pulses is divided by 2)–1" to decide the final absolute position.

It is preferable to use three or more pulses, considering the accuracy of the absolute position. In addition, it is preferable that the above-mentioned number of pulses be equal to the amber of pulses (about 5 to 10) which are output from the magnetic sensor device 50 according to the rotation angle of the rotating cylinder 20 (about 10° to 20° when the diameter $\phi$ of the rotating cylinder 20 is about 80 mm) by one rotation operation. The user can know the absolute position of the zoom lens only by one operation of rotating the zoom ring 9 in a given direction after turning on the lens barrel 20. As a result, an operation of checking the absolute position is simplified, In the above description of the operation, the phase difference is calculated using the data obtained at the time when the amplitude of the A-phase signal is 0. However, data which is obtained at an arbitrary time may be used.

When the phase difference $\theta$ calculated from the A-phase data, the B-phase data, the C-phase data, and the D-phase data which are obtained at the time when the amplitude of any of the A-phase, the B-phase, the C-phase, and the D-phase is 0 is compared to the phase difference $\theta$ calculated from the A-phase data, the B-phase data, the C-phase data, and the D-phase data which are obtained at the time when none of the A-phase, the B-phase, the C-phase, and the B-phase have an amplitude of 0, the phase difference has a value (value with a small error) that is close to the design phase difference. Therefore, when the phase difference $\theta$ is calculated for each pulse from the A-phase data, the B-phase data, the C-phase data, or the D-phase data which is obtained at the time when the amplitude of any of the A-phase, the B-phase, the C-phase, and the D-phase is 0, it is possible to improve the accuracy of the final absolute position of the zoom lens.

In the above-described exemplary embodiment, the zoom lens has been described. However, the claimed invention can also be applied to, for example, a focus lens other than the zoom lens.

In the above-described exemplary embodiment, the average value of the phase differences corresponding to five pulses is used. However, the averaging may not be performed and the amount of correction corresponding to the detected phase difference may be read from the correction table and then corrected. In this case, as described above, a phase difference corresponding to the posture and the amount of inclination of the lens barrel 2 is detected and the amount of correction corresponding to the phase difference is read.

What is claimed is:

1. An imaging lens barrel comprising:
a barrel body configured to hold an imaging lens so as to be movable in an optical axis direction;
a rotating body configured to rotate in accordance with a movement of the imaging lens, the rotating body including a first magnetic scale and a second magnetic scale which are formed in parallel and in which magnetic components with different wavelengths are periodically magnetized in a circumferential direction;
a magnetic sensor device that is provided at a position facing a circumferential surface of the rotating body and includes a first magnetic sensor and a second magnetic sensor, the first magnetic sensor being configured to detect in response to a rotation of the rotating body, from the first magnetic scale, a first phase signal and a second phase signal having a phase shift with respect to the first phase signal, the second magnetic sensor being configured to detect in response to the rotation of the rotating body, from the second magnetic scale, a third phase signal and a fourth phase signal having a phase shift with respect to the third phase signal;
a phase difference calculation section configured to calculate a phase difference between the first phase signal and the third phase signal, using the first phase signal and the second phase signal detected by the first magnetic sensor and the third phase signal and the fourth phase signal detected by the second magnetic sensor;
a correction table memory that stores a correction table storing a correction value for correcting a difference between the phase difference, which is actually calculated by the phase difference calculation section in response to the rotation of the rotating body, and a design value in association with the phase difference;
a phase difference correction section configured to, when a relative position between the rotating body and the magnetic sensor device according to a posture of the imaging lens barrel is different from the relative position of when the correction table is created, correct the phase difference calculated by the phase difference calculation section according to the relative position and to correct the phase difference calculated by the phase difference calculation section, using a correction value corresponding to the corrected phase difference among the correction values stored in the correction table; and to, when the relative position between the rotating body and the magnetic sensor device according to the posture of the imaging lens barrel is not different from the relative position of when the correction table is created, correct the phase difference calculated by the phase difference calculation section, using a correction value corresponding to the phase difference calculated by the phase difference calculation section among the correction values stored in the correction table; and an absolute position calculation section configured to calculate an absolute position of the imaging lens from the phase difference corrected by the phase difference correction section and a predetermined relationship between the phase difference and the absolute position of the imaging lens.

2. The imaging lens barrel according to claim 1, further comprising:

an inclination amount detection section configured to detect an amount of inclination of the imaging lens barrel, wherein the phase difference correction section corrects the phase difference calculated by the phase difference calculation section according to the amount of inclination detected by the inclination amount detection section and corrects the phase difference calculated by the phase difference calculation section using the correction value corresponding to the corrected phase difference among the correction values stored in the correction table.

3. The imaging lens barrel according to claim 1, wherein the correction table memory stores two correction tables which indicate the difference between the phase difference calculated by the phase difference calculation section and the design value of the phase difference and are obtained when the imaging lens is moved in different directions, and the phase difference correction section corrects the phase difference calculated by the phase difference calculation section using the correction table, which corresponds to the moving direction of the imaging lens, of the two correction tables.

4. The imaging lens barrel according to claim 2, wherein the correction table memory stores two correction tables which indicate the difference between the phase difference calculated by the phase difference calculation section and the design value of the phase difference and are obtained when the imaging lens is moved in different directions, and the phase difference correction section corrects the phase difference calculated by the phase difference calculation section using the correction table, which corresponds to the moving direction of the imaging lens, of the two correction tables.

5. A method for controlling an operation of an imaging lens barrel including a barrel body configured to hold an imaging lens so as to be movable in an optical axis direction, and a rotating body configured to rotate in accordance with a movement of the imaging lens, the rotating body including a first magnetic scale and a second magnetic scale which are formed in parallel and in which magnetic components with different wavelengths are periodically magnetized in a circumferential direction, the method comprising:

allowing a phase difference calculation section to calculate a phase difference between a first phase signal and a third phase signal, using the first phase signal and a second phase signal detected by a first magnetic sensor and the third phase signal and a fourth phase signal detected by a second magnetic sensor, the first magnetic sensor and the second magnetic sensor being included in a magnetic sensor device which is provided at a position facing a circumferential surface of the rotating body, the first magnetic sensor being configured to detect in response to a rotation of the rotating body, from the first magnetic scale, the first phase signal, which is a sine wave, and the second phase signal, which has a phase shift with respect to the first phase signal, the second magnetic sensor being configured to detect in response to the rotation of the rotating body, from the second magnetic scale, the third phase signal, which is a sine wave, and the fourth phase signal, which has a phase shift with respect to the third phase signal;

allowing a phase difference correction section to, when a relative position between the rotating body and the magnetic sensor device according to a posture of the imaging lens barrel is different from the relative position of when a correction table is created, which table stores a correction value for correcting a difference between the phase difference, which is actually calculated by the phase difference calculation section in response to the rotation of the rotating body, and a design value in association with the phase difference, correct the phase difference calculated by the phase difference calculation section according to the relative position and to correct the phase difference calculated by the phase difference calculation section, using a correction value corresponding to the corrected phase difference among the correction values stored in the correction table; and to, when the relative position between the rotating body and the magnetic sensor device according to the posture of the imaging lens barrel is not different from the relative position of when the correction table is created, correct the phase difference calculated by the phase difference calculation section, using a correction value corresponding to the phase difference calculated by the phase difference calculation section among the correction values stored in the correction table; and allowing an absolute position calculation section to calculate an absolute position of the imaging lens from the phase difference corrected by the phase difference correction section and a predetermined relationship between the phase difference and the absolute position of the imaging lens.

* * * * *